US012585836B2

(12) United States Patent　　　　(10) Patent No.:　US 12,585,836 B2

Tsorng et al.　　　　　　　　　　　　(45) Date of Patent:　Mar. 24, 2026

(54) ROTATING INTRUSION-DETECTION MODULE FOR A COMPUTING STORAGE DEVICE

(71) Applicant: Quanta Computer Inc., Taoyuan City (TW)

(72) Inventors: Yaw-Tzorng Tsorng, Taoyuan City (TW); Ming-Lung Wang, Taoyuan City (TW); Jia-Lin Chen, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 113 days.

(21) Appl. No.: 18/404,838

(22) Filed: Jan. 4, 2024

(65) Prior Publication Data

US 2025/0225280 A1　　　Jul. 10, 2025

(51) Int. Cl.
G06F 21/88　　　　(2013.01)

(52) U.S. Cl.
CPC ................................... G06F 21/88 (2013.01)

(58) Field of Classification Search
CPC .. G06F 21/88; G06F 2221/2143; G06F 21/86;
　　　G06F 21/554; A47B 67/04; E05B 65/463
See application file for complete search history.

(56) References Cited

U.S. PATENT DOCUMENTS

| | | | | |
|---|---|---|---|---|
| 8,687,371 | B2 * | 4/2014 | Arshad | ................ H05K 1/0275 |
| | | | | 235/382 |
| 8,836,509 | B2 * | 9/2014 | Lowy | ...................... G06F 21/86 |
| | | | | 361/752 |
| 10,465,422 | B2 * | 11/2019 | Ullrich | .................. E05B 1/0007 |
| 11,434,663 | B2 * | 9/2022 | Ullrich | ................ E05B 47/0603 |
| 12,229,306 | B2 * | 2/2025 | Caldwell | ................ G06F 21/46 |
| 12,277,256 | B2 * | 4/2025 | Kwak | ................... H01L 23/053 |
| 12,279,370 | B2 * | 4/2025 | Lin | ...................... G08B 13/128 |
| 12,299,183 | B1 * | 5/2025 | Satpathy | ................ G06F 21/31 |
| 12,306,937 | B1 * | 5/2025 | Siu | ......................... G06F 21/566 |

* cited by examiner

*Primary Examiner* — Hosuk Song
(74) *Attorney, Agent, or Firm* — NIXON PEABODY LLP

(57)　　　　　　　　　ABSTRACT

A computing system includes a drawer configured to receive a plurality of computing storage devices. The drawer is movable between an open position and a plurality of closed positions. A printed circuit board (PCB) is mounted within the drawer in electronic communication with the plurality of computing devices. An intrusion-detection switch is attached to the PCB and is configured to detect movement of the drawer between the open position and the closed positions. A rotating module is attached to the movable drawer for extending an operating range of the intrusion-detection switch. The rotating module is in initial contact with the intrusion-detection switch when the drawer is in the initial closed position. The rotating module has a rotating unit that rotates in response to the drawer moving from an initial closed position to a maximum closed position.

22 Claims, 11 Drawing Sheets

ROTATING INTRUSION-DETECTION MODULE FOR A COMPUTING STORAGE DEVICE

FIELD OF THE INVENTION

The present invention relates generally to computing systems, and more specifically, to detection of intrusion for computing storage devices.

BACKGROUND OF THE INVENTION

IT systems generally require data centers that accommodate a mass number of data storage devices, including server systems. Maintenance and replacement of components in these devices are performed in respective housing racks. For example, drawer-based data storage devices require opening drawers when performing device maintenance and hard disk drive ("HDD") replacement.

Typically, the data storage devices includes intrusion-detection switches on the drawers. These switches detect and record when the drawer is opened or closed. However, based on complexity of drawer assembly, a problem with current devices is that assembly tolerance of a drawer may exceed an effective operating range of the intrusion-detection switch. Thus, the intrusion-detection switch becomes ineffective after initial assembly.

Yet another problem occurs during usage or transportation of the data storage devices. Collisions between the intrusion-detection switch and drawer features may result in false triggering or damage of the intrusion-detection switch. The present disclosure provides a solution for these and other problems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system includes a drawer configured to receive a plurality of computing storage devices. The drawer is movable between an open position and a plurality of closed positions. The plurality of closed positions includes an initial closed position and a maximum closed position. The computing system further includes a printed circuit board (PCB) mounted within the drawer. The PCB is in electronic communication with the plurality of computing devices. The computing system further includes an intrusion-detection switch attached to the PCB. The intrusion-detection switch is configured to detect movement of the drawer between the open position and the plurality of closed positions. The computing system further includes a rotating module that is attached to the movable drawer for extending an operating range of the intrusion-detection switch. The rotating module is in initial contact with the intrusion-detection switch when the drawer is in the initial closed position. The rotating module has a rotating unit that rotates in response to the drawer moving from the initial closed position to the maximum closed position.

According to certain aspects of the computing system described above, the rotating unit is in contact with intrusion-detection switch as the drawer moves between the initial closed position and the maximum closed position.

According to some aspects of the computing system described above, the drawer travels linearly a predetermined tolerance distance between the initial closed position and the maximum closed position.

According to other aspects of the computing system described above, the predetermined tolerance distance corresponds to a rotatable distance of the rotating unit.

According to other aspects of the computing system described above, the drawer is movable in response to a user force during a maintenance operation.

According to other aspects of the computing system described above, at least one of the plurality of computing storage devices is a server.

According to other aspects of the computing system described above, the rotating module includes a spring that exerts a force on the rotating unit.

According to other aspects of the computing system described above, the force of the spring is opposite in direction relative to movement of the drawer toward the plurality of closed positions.

According to other aspects of the computing system described above, the spring is a torsion spring.

According to other aspects of the computing system described above, the rotating module includes a base that is fixedly attached to the movable drawer, the spring having a first end mounted on the base and a second end mounted on the rotating unit.

According to other aspects of the computing system described above, the computing system further has a chassis for receiving the drawer. The rotating module further includes a position pin mounted in part within the base. The position pin prevents rotational movement of the base relative to the chassis.

According to other aspects of the computing system described above, the rotating module includes a fastener rotatably attaching the rotating unit with the base.

According to other aspects of the computing system described above, the rotating unit includes a standoff component that separates the rotating unit from the base.

According to other aspects of the computing system described above, the standoff component is axially aligned with the spring.

According to other aspects of the present disclosure, a computing system includes a drawer movable between an open position and a closed position. The computing system further includes an intrusion-detection switch configured to detect movement of the drawer between the open position and the closed position. The computing system further includes a rotating module mounted within to the drawer. The rotating module includes a base fixed to the drawer, and a spring having a first end and a second end. The first end is attached to the base. The rotating module further includes a rotating unit rotatably attached to the base. The second end of the spring is attached to the rotating unit to exert a force between the base and the rotating unit. The rotating unit is in contact with the intrusion-detection switch when the drawer is in the closed position. The rotating unit rotates in response to movement of the drawer in the closed position along a predetermined tolerance distance.

According to certain aspects of the computing system described above, the rotating unit is attached to the base via a fastener. The fastener is coaxial with the spring.

According to other aspects of the computing system described above, the computing system further has a chassis for receiving the drawer. The rotating module further includes a position pin mounted in part within the base. The position pin prevents rotational movement of the base relative to the chassis.

According to yet other aspects of the present disclosure, a method is directed to detecting intrusion in a computing system. The method includes providing a drawer for receiving a plurality of computing storage devices. The method further includes configuring the drawer for movement between an open position and a closed position. The method further includes detecting movement of the drawer via physical contact between an intrusion-detection switch and a rotating module. The physical contact occurs in an initial contact position and continues through a maximum contact position. The method further includes, in response to the physical contact, rotating a rotating unit of the rotating module along a predetermined tolerance distance of the drawer in the closed position. The predetermined tolerance distance is a maximum operating range of the drawer that is defined by the initial contact position and the maximum contact position.

According to certain aspects of the method described above, the method further includes moving the drawer in response to a user force during a maintenance operation.

According to other aspects of the method described above, the method further includes exerting a spring force on the rotating unit, the spring force being opposite in direction to movement of the drawer towards the closed position.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

Figure 1:
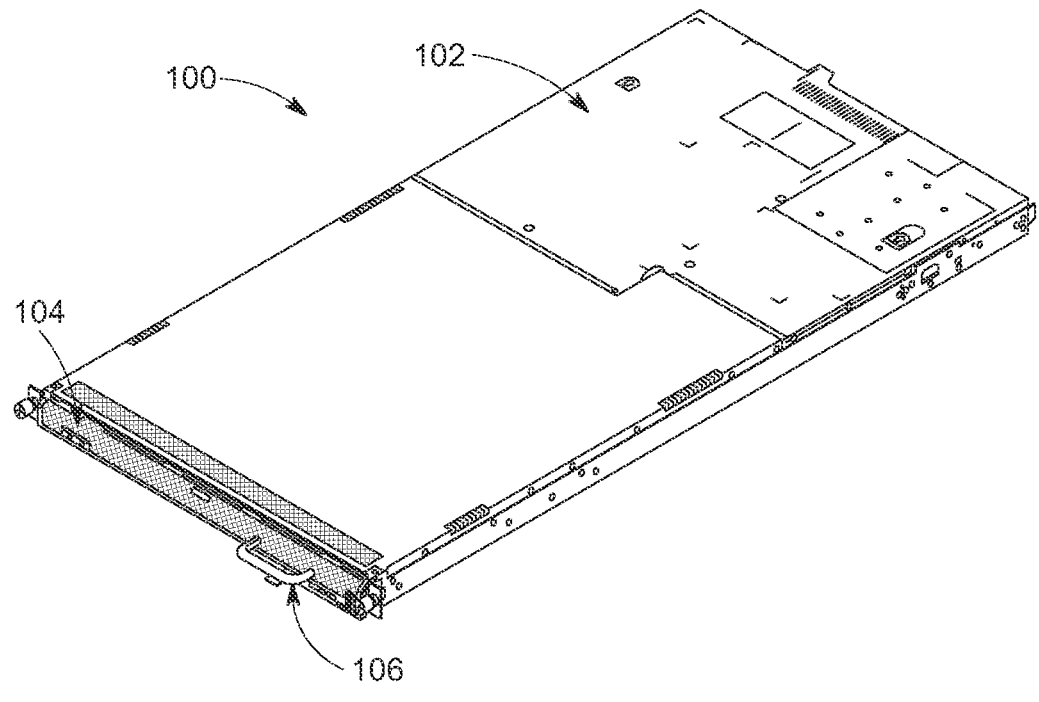
FIG. 1 is a perspective view of a data storage device, in accordance with aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a computing system 100 is illustrated in the form of a server. The computing system 100 has a chassis 102 in which a drawer 104 is housed. The drawer 104 has a handle 106 that facilitates opening and closing of the drawer 104 relative to the chassis 102. In FIG. 1, the drawer 104 is in a closed position.

Figure 2:
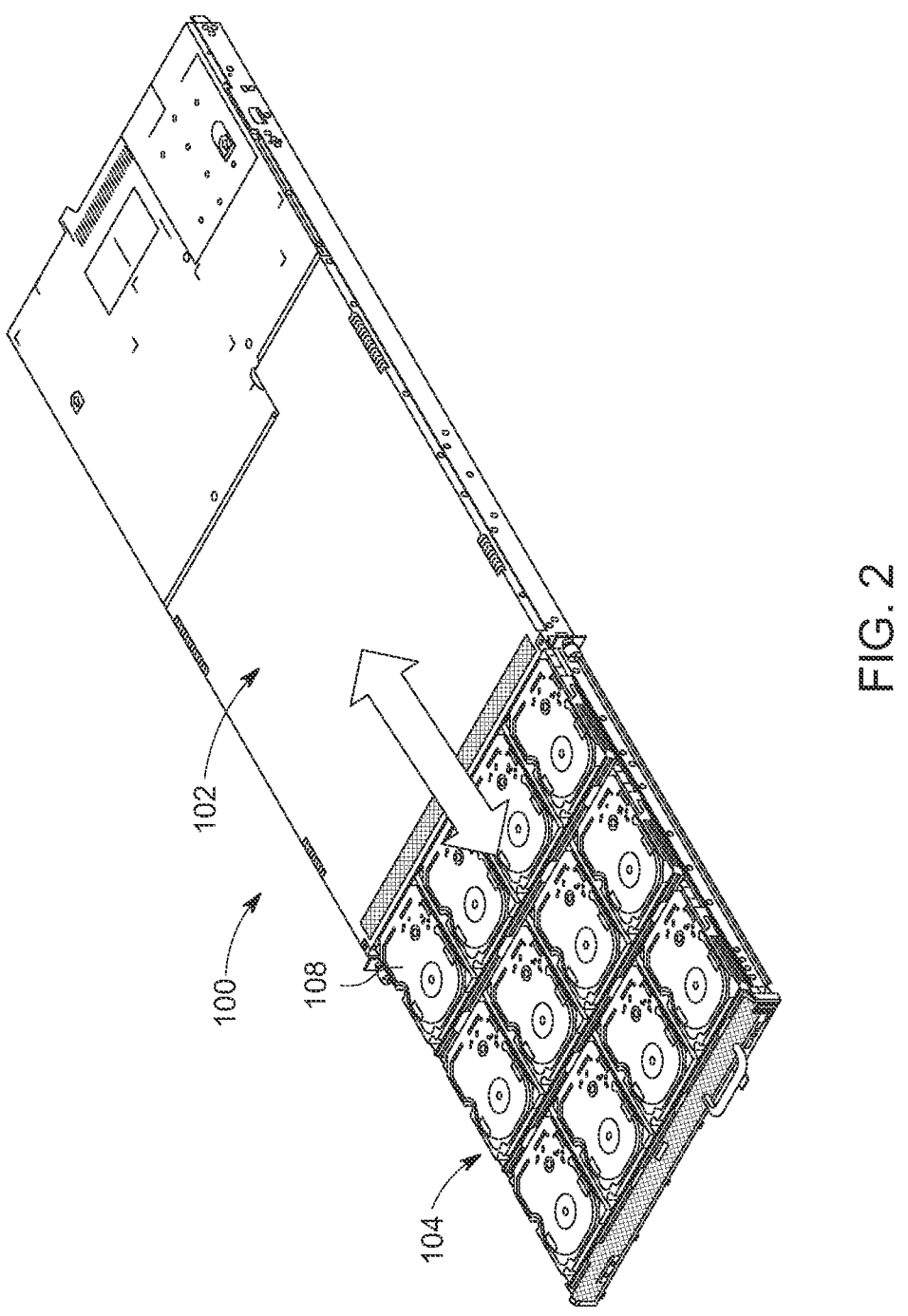
FIG. 2 is a perspective view illustrating the data storage device of FIG. 1 with an open drawer, in accordance with other aspects of the present disclosure.

Referring to FIG. 2, the drawer 104 is in an open position relative to the chassis 102 of the computing system 100. The drawer 104 has mounted within a plurality of computing storage devices 108. One, some, or all of the computing storage devices 108 include an HDD, solid state drive (SSD), or other computing component. The computing storage devices 108 are optionally arranged in array form, along respective rows and columns (e.g., 12 computing storage devices 108 in 3 rows×4 columns).

Figure 3:
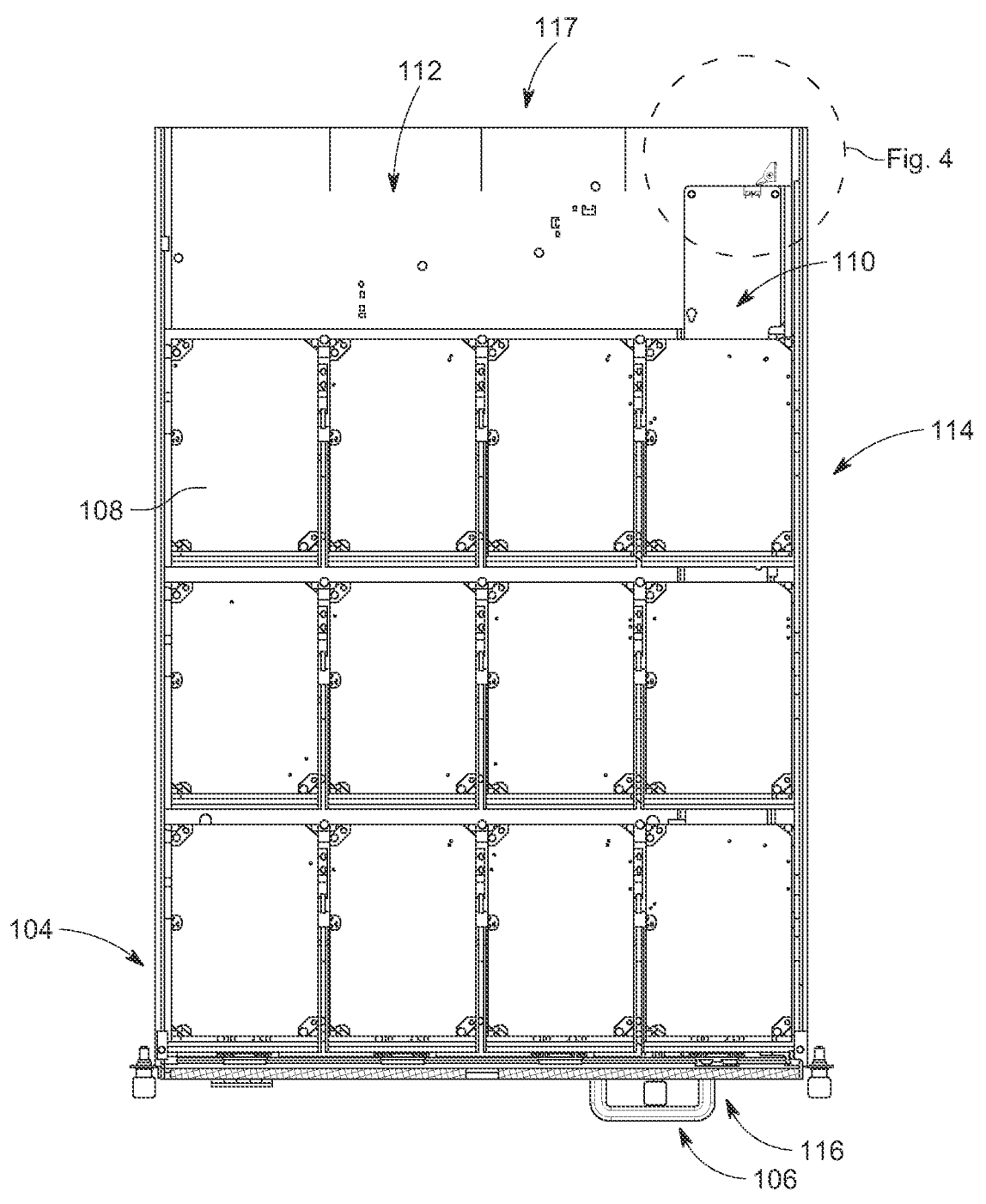
FIG. 3 is a top view illustrating internal components of the drawer shown in FIG. 2, in accordance with other aspects of the present disclosure.

Referring to FIG. 3, the computing storage devices 108 are in electronic communication with a printed circuit board ("PCB") 110. The PCB 110 is fixed along a bottom surface 112 of the drawer 104, for example, along a right side 114 of the drawer 104. Optionally, the PCB 110 extends from (or near) a front side 116 of the drawer 104 to (or near) a back side 117 of the drawer 104.

The handle 106 is mounted on the front side 116 of the drawer 104. When maintenance or other technical intervention is required, a user grabs the handle 106 to open or close the drawer 104. As such, the drawer 104 is movable in response to a user force during a maintenance or other operations.

Figure 4:
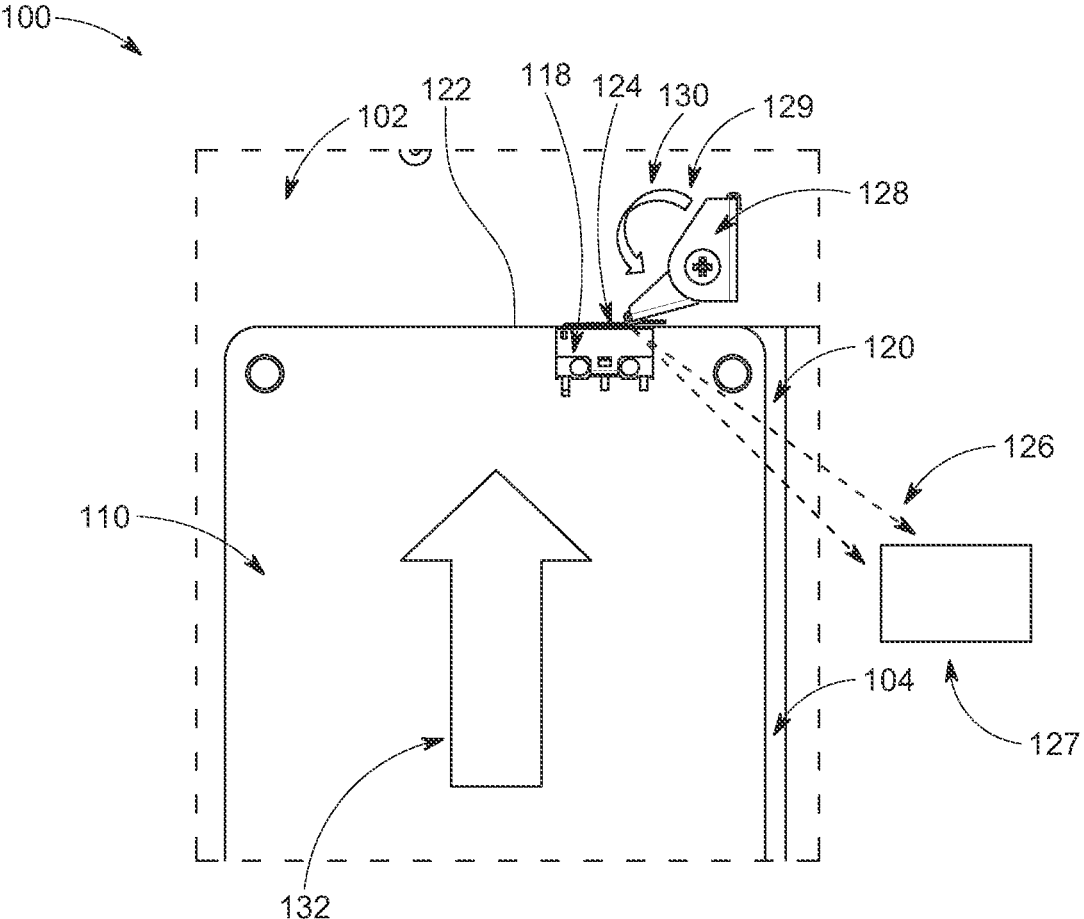
FIG. 4 is a top enlarged view illustrating interaction between an intrusion-detection switch and a rotating module of the drawer shown in FIG. 3, in accordance with other aspects of the present disclosure.

Referring to FIG. 4, an intrusion-detection switch 118 is mounted in a rear area 120 of the drawer 104. For example, in the illustrated embodiment, the intrusion-detection switch 118 is mounted along a rear edge 122 of the PCB 110. The intrusion-detection switch 118 has a movable sensor 124 that produces one or more signals 126 indicative of an applicable position of the drawer 104. The signals 126 are communicated in electrical or electronic form to a controller 127 for recordation or further action purposes. As such, the intrusion-detection switch 118 is configured to detect movement of the drawer 104 between positions, including the open position and the closed position.

A rotating module 128 is mounted to the chassis 102 in a rear area 129 of the chassis 102. More specifically, the rotating module 128 is mounted such that it is in proximity to, and makes contact with, the intrusion-detection switch 118 when the drawer 104 is in the closed position.

The rotating module 128 is beneficial for many reasons, including using spring characteristics to increase an effective range of the intrusion-detection switch 118, as disclosed below in more detail. In another beneficial example, the rotating module 128 absorbs impact forces during usage or transportation of the drawer 104, thereby enhancing durability and stability of the intrusion-detection switch 118. In yet another beneficial example, the rotating module 128 prevents occurrences of over-compression or failure to trigger the intrusion-detection switch 118.

Based on the relatively close positioning of the intrusion-detection switch 118 and the rotating module 128, the signal 126 indicates when the drawer 104 is in the closed position and when the drawer 104 is in the open position. For example, if the intrusion-detection switch 118 is not in contact with the rotating module 128, the signal 126 is indicative of the open position. Instead, by way of example, if the intrusion-detection switch 118 is in contact with the rotating module 128, the signal 126 is indicative of the closed position.

The rotating module 128 operates with a rotational force 130 that is opposite to a user force 132, which presses the drawer 104 into the closed position. Thus, the rotational force 130 is opposite in direction relative to movement of the drawer 104 toward the closed position. As further disclosed below, the rotating module 128 provides a predetermined tolerance distance along which the drawer 104 is movable while in the closed position. Consequently, damage to the computing system 100 or unintended false alarms are reduced or prevented.

Based on the signal 126, recorded positions of the drawer 104 are provided to the controller 127. The recorded positions may include additional metadata, such as the time the signal 126 is provided and the operation of the storage device 108. This information provides insight into who and when the computing storage devices 108 may have been accessed. In turn, security or other concerns related to the computing storage devices 108 may be properly addressed.

Figure 5:
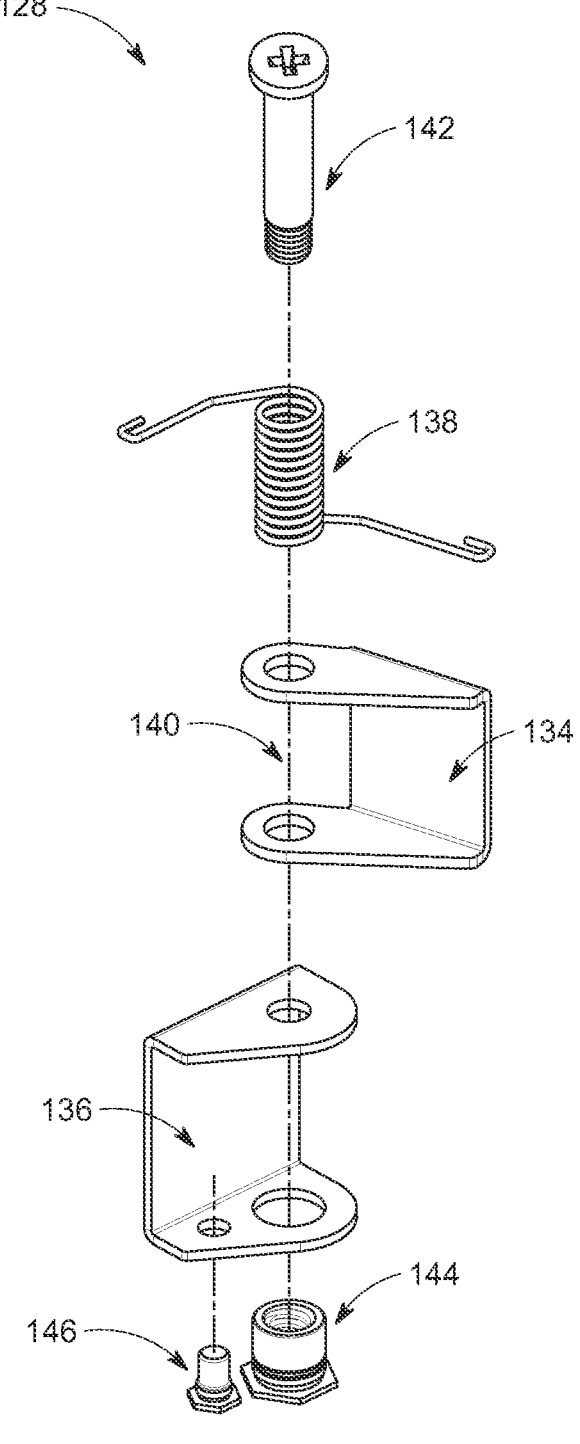
FIG. 5 is an exploded perspective view illustrating the rotating module of FIG. 4, in accordance with other aspects of the present disclosure.
Figure 6:
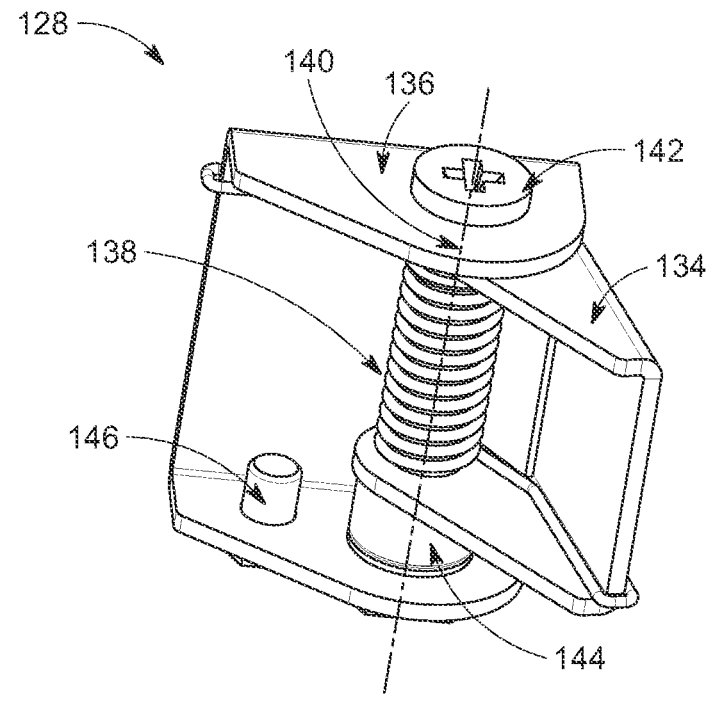
FIG. 6 is an assembled perspective view of the rotating module of FIG. 5, in accordance with other aspects of the present disclosure.

Referring to FIGS. 5 and 6, the rotating module 128 includes a rotating unit 134 that is rotatably coupled with a base 136. The rotating module 128 further includes a spring 138 that is mounted between the rotating unit 134 and the base 136 along a mounting axis 140. A fastener 142 is inserted through the spring 138, along the mounting axis 140, to rotatably fix the rotating unit 134 to the base 136 and the spring 138.

The rotating module 128 further includes a standoff component 144 that is inserted through the base 136. The standoff component 144 is configured to limit linear movement of the rotating unit 134 along the mounting axis 140.

The rotating module 128 further includes a position pin 146 that is inserted through the base 136. The position pin 146 is configured to fix rotation of the base 136.

Figure 7:
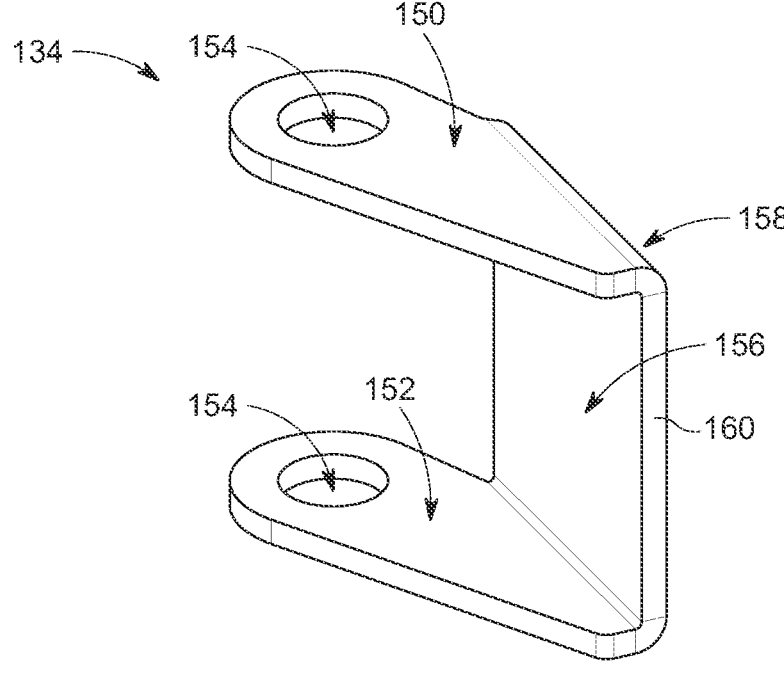
FIG. 7 is a perspective view of a rotating unit of the rotating module of FIG. 5, in accordance with other aspects of the present disclosure.

Referring to FIG. 7, the rotating unit 134 generally actuates the intrusion-detection switch 118 and transfers energy to the spring 138. The rotating unit 134 has two rotating sides that include a first rotating side 150 and a second rotating side 152. The rotating sides 150, 152 are generally parallel and offset from each other. Each of the rotating sides 150, 152 has a rotating fastener hole 154 for receiving therein the fastener 142.

A rotating wall 156 is generally perpendicular to and connects the first rotating side 150 with the second rotating side 152. The rotating wall 156 has a contact side 158 via which the rotating module 128 makes direct contact with the intrusion-detection switch 118. The direct contact is generally along portions of the contact side 158, including optionally along a contact edge 160.

According to an exemplary embodiment, the rotating unit 134 includes in whole or in part a material that is metal or plastic. The material for the rotating unit 134 is configured to prevent abrasion, cracking, and distortion after loading into the drawer 104.

Figure 8:
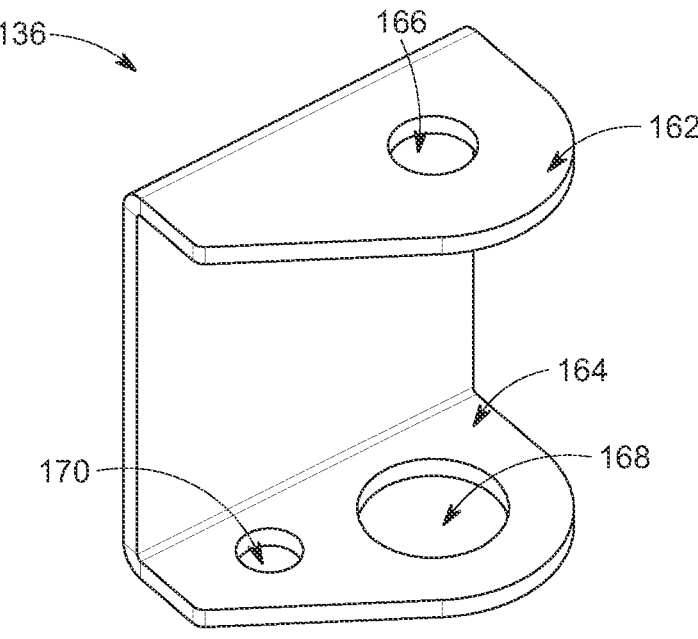
FIG. 8 is a perspective view of a base of the rotating module of FIG. 5, in accordance with other aspects of the present disclosure.

Referring to FIG. 8, the base 136 generally serves as a fixed point for one end of the spring 138 (as further disclosed below). The base 136 has two base sides that include a first base side 162 and a second base side 164. The base sides 162, 164 are generally parallel and offset from each other. The first base side 162 has a base fastener hole 166 for receiving therein the fastener 142. The second base side 164 has a base standoff hole 168 for receiving therein the standoff component 144. The second base side 164 also has a base pin hole 170 for receiving therein the position pin 146.

According to an exemplary embodiment, the base standoff hole 168 has a larger diameter than both the base fastener hole 166 and the base pin hole 170. According to another exemplary embodiment, the base standoff hole 168 has a larger diameter than just one of the base fastener hole 166 or the base pin hole 170. According to another exemplary embodiment, the base fastener hole 166 has a larger diameter than the base pin hole 170.

According to an exemplary embodiment, the base 136 includes in whole or in part a material that is metal or plastic. The material for the base 136 is configured to prevent abrasion, cracking, and distortion after loading.

Figure 9:
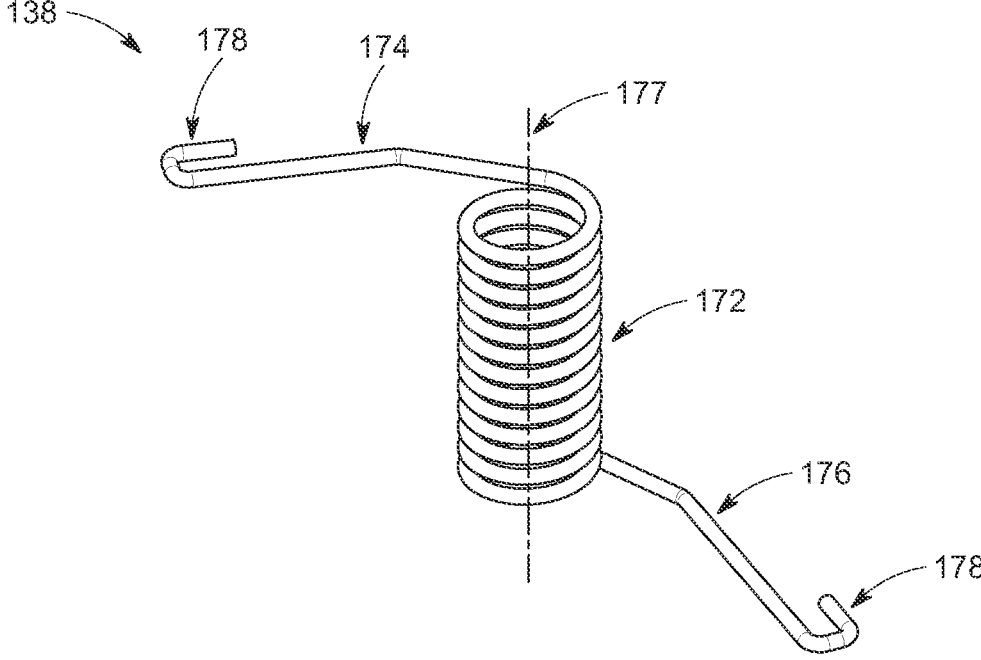
FIG. 9 is a perspective view of a spring of the rotating module of FIG. 5, in accordance with other aspects of the present disclosure.

Referring to FIG. 9, the spring 138 generally absorbs energy and prevents the intrusion-detection switch 118 from being over-pressed or subjected to undesirable shock forces during movement of the drawer 104. The spring 138 has a main body 172 from which two arms 174, 176 extend. The main body 172 extends longitudinally along a central axis 177, which generally passes through an imaginary center point of a center through hole 180 of the main body 172. The two arms 174, 176 include a first arm 174 at one end of the main body 172, and a second arm 176 at another end of the main body 172. According to one example, the spring 138 is a torsion spring. Each of the two arms 174, 176 has a hook end 178.

According to an exemplary embodiment, the spring 138 includes in whole or in part a material that is metal or plastic. The material for the spring 138 is configured to prevent abrasion, cracking, and distortion after loading.

Figure 10:
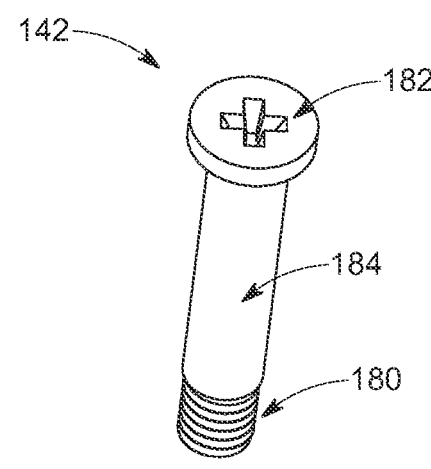
FIG. 10 is a perspective view of a fastener of the rotating module of FIG. 5, in accordance with other aspects of the present disclosure.

Referring to FIG. 10, the fastener 142 has a threaded end 180 and a mounting end 182. A shaft 184 extends between and connects the threaded end 180 and the mounting end 182. According to one example, the fastener 142 is a bolt or screw having a Phillips-type or straight-type receiving slots. The fastener 142 is coaxial with the spring 138 along the mounting axis 140. According to an exemplary embodiment, the standoff component 144 included in whole or in part a metal material.

Figure 11:
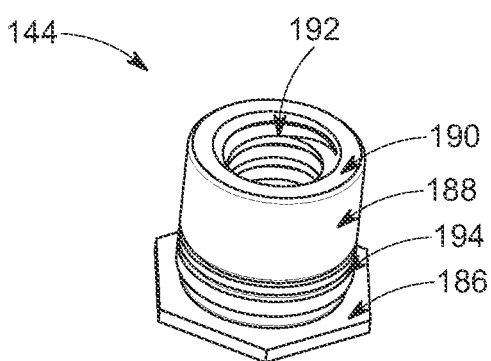
FIG. 11 is a perspective view of a standoff component of the rotating module of FIG. 5, in accordance with other aspects of the present disclosure.

Referring to FIG. 11, the standoff component 144 generally locates and fixes the rotating module 128 in the computing system 100, and, more specifically, locates and fixes the base 136 and the rotating unit 134 to the chassis 102. The standoff component 144 has a standoff head 186 from which a standoff body 188 extends and which terminates in a standoff end 190. Optionally, the standoff component 144 has a generally circular cross-sectional shape. The standoff component 144 is axially aligned with the spring 138 along the mounting axis 140 (which also coincides with the central axis 177)

According to an exemplary embodiment, the standoff head 186 has a hex-nut shape, which facilitates attachment to the fastener 142. The standoff end 190 has an internal thread 192 configured to receive within the threaded end 180 of the fastener 142.

Optionally, the standoff component 144 further has a rim 194 configured for positioning within the base 136. More specifically, the rim 194 is configured for positioning adjacent or near an internal surface of the second base side 164.

The standoff component 144 attaches the base 136 to the chassis 102. More specifically, the standoff component 144 provides one of two attachment points between the base 136 and the chassis 102. According to an exemplary embodiment, the standoff component 144 included in whole or in part a metal material.

Figure 12:
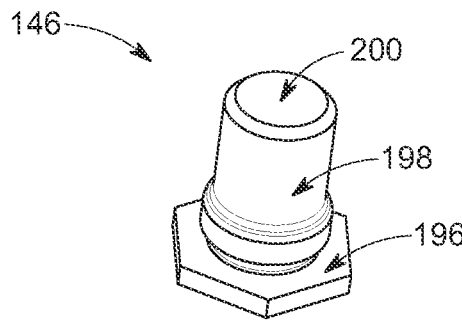
FIG. 12 is a perspective view of a position pin of the rotating module of FIG. 5, in accordance with other aspects of the present disclosure.

Referring to FIG. 12, the position pin 146 generally locates and fixes the rotating module 128 in the computing system 100, and, more specifically, locates and fixes the base 136 to the chassis 102. The position pin 146 has a pin head 196 from which a pin body 198 extends and which terminates in a pin end 200. Optionally, the position pin 146 has a generally circular cross-sectional shape. According to an exemplary embodiment, the pin head 196 has a hex-nut shape and the pin end 200 is a solid projection.

The position pin 146 also attaches the base 136 to the chassis 102. More specifically, the position pin 146 provides a second one of the two attachment points between the base 136 and the chassis 102. As such, the position pin 146 prevents rotational movement of the base 136 relative to the chassis 102. According to an exemplary embodiment, the standoff component 144 included in whole or in part a metal material.

Figure 13:
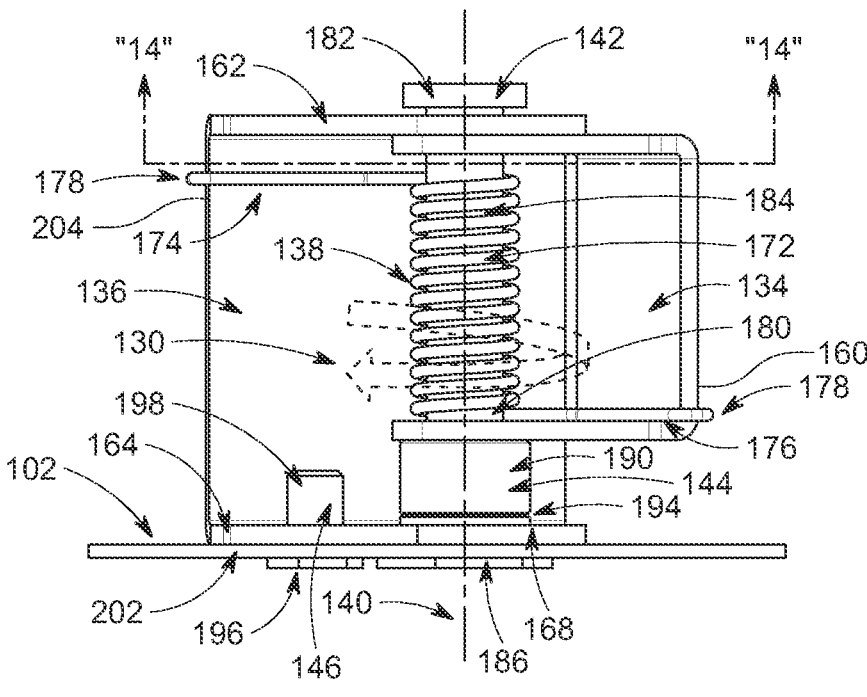
FIG. 13 is a side view of the rotating module of FIG. 6, in accordance with other aspects of the present disclosure.

Referring to FIG. 13, the standoff component 144 is mounted along the mounting axis 140, and is received through the base standoff hole 168. The standoff head 186 is mounted in contact with a bottom wall 202 of the chassis 102. The rim 194 is generally adjacent or near the internal surface of the second base side 164. The standoff end 190 is attached to the fastener 142.

The fastener 142 is also mounted along the mounting axis 140, attaching the base 136 with the rotating unit 134 and the standoff component 144. More specifically, the mounting end 182 of the fastener 142 is external to an external surface of the first base side 162. The shaft 184 extends through the main body 172 of the spring 138, while the threaded end 180 is inserted into the standoff end 190.

The rotating unit 134 is captured, in a rotatable manner, between an internal surface of the first base side 162 and a top surface of the standoff end 190. As such, the standoff component 144 fixes the rotating unit 134 in place along the mounting axis 140.

The spring 138 provides the rotational force 130 between the rotating unit 134 and the base 136. Specifically, the first arm 174 of the spring 138 is fixed (via its respective hook end 178) to a support edge 204 of the base 136. The second arm 176 is fixed (via its respective hook end 178) to the contact edge 160 of the rotating unit 134. As such, spring tension causes the rotational force 130 between the rotating unit 134 and the base 136.

The pin head 196 of the position pin 146 is also mounted in contact with the bottom wall 202 of the chassis 102. The pin body 198 extends through the second base side 164, thus fixing in place the base 136 relative to the chassis 102.

Figure 14:
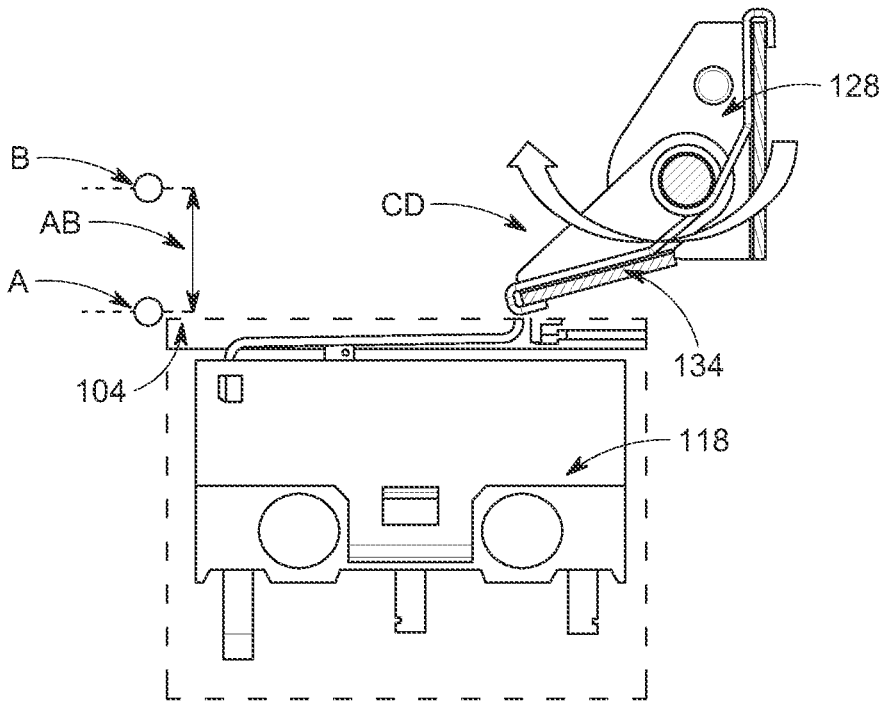
FIG. 14 is a top cross-sectional view illustrating the rotating module along lines "14-14" of FIG. 13, in accordance with other aspects of the present disclosure.

Referring to FIG. 14, the rotating module 128 is configured to extend the operating range of the intrusion-detection switch 118. For example, the rotating module 128 is in initial contact with the intrusion-detection switch 118 when the drawer 104 is in an initial closed position at point A. However, based on various factors (such as unintended collisions during transportation), the rotating unit 134 rotates in response to the drawer 104 moving from the initial closed position at point A to a maximum closed position at point B. The rotating unit 134 maintains contact with the intrusion-detection switch 118 between the initial closed position at point A and the maximum closed position at point B.

As such, the rotating module 128 extends an operating range of the intrusion-detection switch 118 for a predetermined tolerance distance AB (between points A and B). The predetermined tolerance distance AB corresponds to a rotatable distance CD of the rotating unit 134.

In the above example, the movement of the rotating unit 134 has been disclosed in accordance with at least two closed positions: the initial closed position and the maximum closed position. In other examples, the movement of the rotating unit 134 is further disclosed in reference to a single closed position in which the rotating unit 134 rotates in response to movement of the drawer 104 along the predetermined tolerance distance AB. In other words, the movement of the rotating unit 134 provides a rotational tolerance if collisions, movements, or other tolerance-related aspects require flexibility in movement of the drawer 104.

Figure 15:
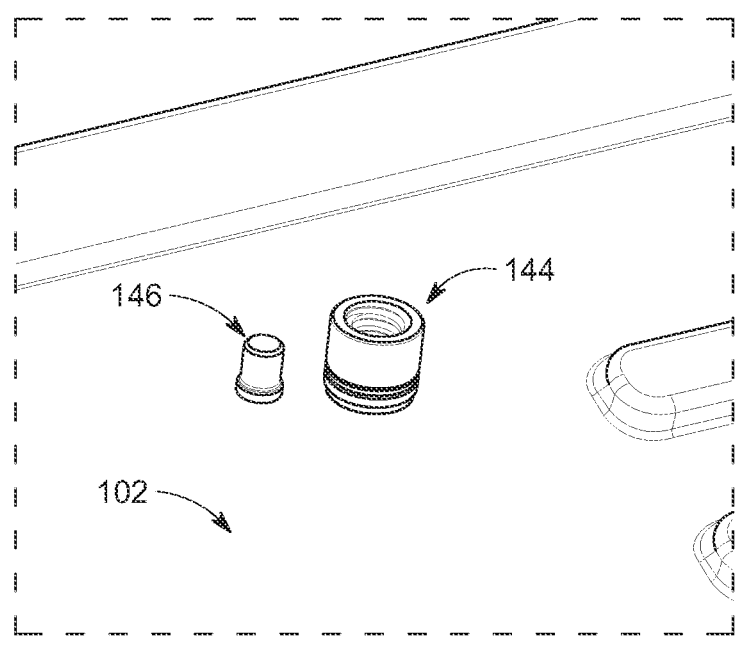
FIG. 15 is a perspective view illustrating a pre-installation step of the rotating module of FIG. 5, in accordance with other aspects of the present disclosure.
Figure 16:
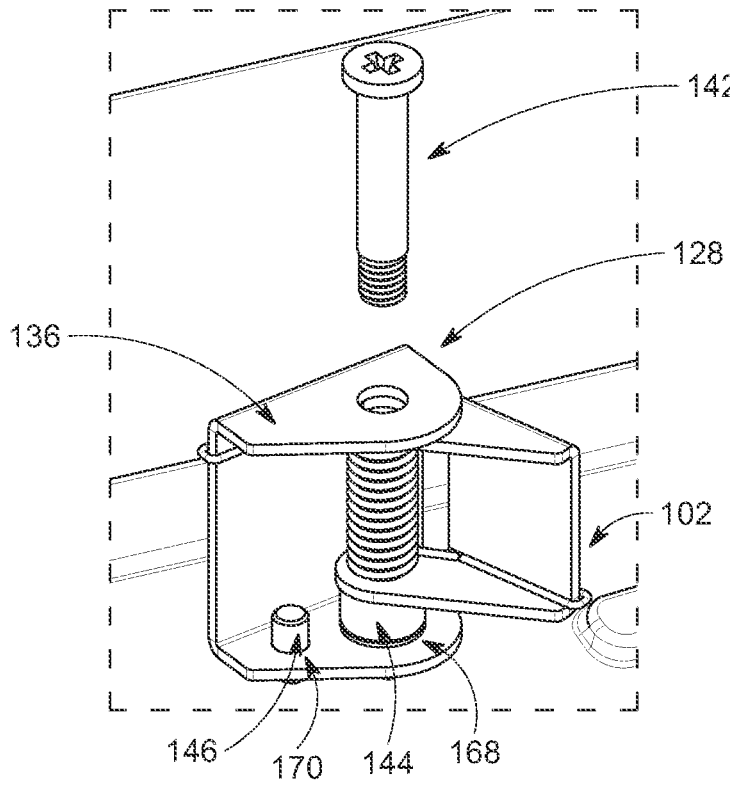
FIG. 16 is a perspective view illustrating an installation step of the rotating module of FIG. 5, in accordance with other aspects of the present disclosure.
Figure 17:
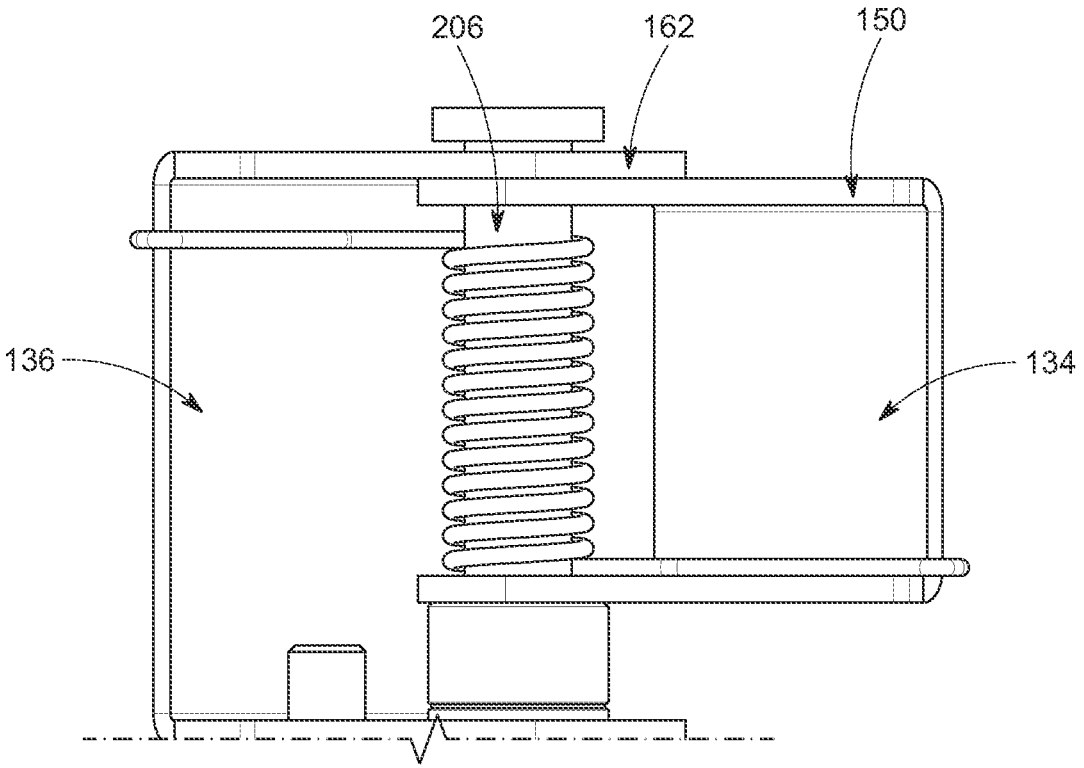
FIG. 17 is a perspective view illustrating a gap for free rotation of a rotating unit, in accordance with other aspects of the present disclosure.

Referring generally to FIGS. 15-17, installation of the rotating module 128 to the chassis 102 includes at least two steps in accordance with an exemplary embodiment. Referring specifically to FIG. 15, in a pre-installation step, the standoff component 144 and the position pin 146 are initially fixedly attached to the chassis 102. Referring specifically to FIG. 16, in an installation step, the base 136 is attached to the standoff component 144 and the position pin 146 (i.e., by having the standoff component 144 and the position pin 146 protruding, respectively, through the base standoff hole 168 and the base pin hole 170). Then, the fastener 142 is threaded into the standoff component 144, securing the rotating module 128 to the chassis 102. As such, the standoff component 144 fixedly attaches the rotating module 128 to the chassis 102, while the position pin 146 prevents undesirable rotation of the base 136. Referring specifically to FIG. 17, the installation leaves a gap 206 between the first base side 162 and the first rotating side 150 to allow free rotation of the rotating unit 134 relative to the base 136.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:

a drawer configured to receive a plurality of computing storage devices, the drawer being movable between an open position and a plurality of closed positions, the plurality of closed positions including an initial closed position and a maximum closed position;

a printed circuit board (PCB) mounted within the drawer, the PCB being in electronic communication with the plurality of computing storage devices;

an intrusion-detection switch attached to the PCB, the intrusion-detection switch being configured to detect movement of the drawer between the open position and the plurality of closed positions, the movement being caused by a user force during a maintenance or other operations; and a rotating module attached to the drawer for extending an operating range of the intrusion-detection switch, the rotating module being in initial contact with the intrusion-detection switch when the drawer is in the initial closed position, the rotating module having a rotating unit that rotates in response to the drawer moving from the initial closed position to the maximum closed position.

2. The computing system of claim 1, wherein the rotating unit is in contact with intrusion-detection switch as the drawer moves between the initial closed position and the maximum closed position.

3. The computing system of claim 1, wherein the drawer travels linearly a predetermined tolerance distance between the initial closed position and the maximum closed position.

4. The computing system of claim 3, wherein the predetermined tolerance distance corresponds to a rotatable distance of the rotating unit.

5. The computing system of claim 1, wherein the drawer is movable in response to a user force during a maintenance operation.

6. The computing system of claim 1, wherein at least one of the plurality of computing storage devices is a server component.

7. The computing system of claim 1, wherein the rotating module includes a spring that exerts a force on the rotating unit.

8. The computing system of claim 7, wherein the force of the spring is opposite in direction relative to movement of the drawer toward the plurality of closed positions.

9. The computing system of claim 7, wherein the spring is a torsion spring.

10. The computing system of claim 7, wherein the rotating module includes a base that is fixedly attached to the movable drawer, the spring having a first end mounted on the base and a second end mounted on the rotating unit.

11. The computing system of claim 10, further comprising a chassis for receiving the drawer, the rotating module further including a position pin mounted in part within the base, the position pin preventing rotational movement of the base relative to the chassis.

12. The computing system of claim 10, wherein the rotating module includes a fastener rotatably attaching the rotating unit with the base.

13. The computing system of claim 10, wherein the rotating unit includes a standoff component that separates the rotating unit from the base.

14. The computing system of claim 13, wherein the standoff component is axially aligned with the spring.

15. A computing system comprising:

a drawer movable between an open position and a closed position;

an intrusion-detection switch configured to detect movement of the drawer between the open position and the closed position, the movement being caused by a user force during a maintenance or other operations; and a rotating module mounted within the drawer and including a base fixed to the drawer, a spring having a first end and a second end, the first end being attached to the base; and a rotating unit rotatably attached to the base, the second end of the spring being attached to the rotating unit to exert a force between the base and the rotating unit, the rotating unit being in contact with the intrusion-detection switch when the drawer is in the closed position, the rotating unit rotating in response to movement of the drawer in the closed position along a predetermined tolerance distance.

16. The computing system of claim 15, wherein the rotating unit is attached to the base via a fastener, the fastener being coaxial with the spring.

17. The computing system of claim 15, further comprising a chassis for receiving the drawer, the rotating module further including a position pin mounted in part within the base, the position pin preventing rotational movement of the base relative to the chassis.

18. A method for detecting intrusion in a computing system, the method comprising:

providing a drawer for receiving a plurality of computing storage devices;

configuring the drawer for movement between an open position and a closed position, the movement being caused by a user force during a maintenance or other operations;

detecting movement of the drawer via physical contact between an intrusion-detection switch and a rotating module, the physical contact occurring in an initial contact position and continuing through a maximum contact position; and in response to the physical contact, rotating a rotating unit of the rotating module along a predetermined tolerance distance of the drawer in the closed position, the predetermined tolerance distance being a maximum operating range of the drawer that is defined by the initial contact position and the maximum contact position.

19. The method of claim 18, further comprising moving the drawer in response to a user force during a maintenance operation.

20. The method of claim 18, further comprising exerting a spring force on the rotating unit, the spring force being opposite in direction to movement of the drawer towards the closed position.

21. A computing system comprising:

a drawer configured to receive a plurality of computing storage devices, the drawer being movable between an open position and a closed position;

a printed circuit board (PCB) mounted within the drawer;

an intrusion-detection switch attached to the PCB, the intrusion-detection switch being configured to detect movement of the drawer between the open position and the closed position, the movement being caused by a user force; and a rotating module attached to the movable drawer for extending an operating range of the intrusion-detection switch, the rotating module being in initial contact with the intrusion-detection switch when the drawer is in the closed position, the rotating module having a rotating unit that rotates in response to the drawer moving from the closed position.

22. A computing system comprising:

a drawer movable between an open position and a closed position;

an intrusion-detection switch configured to detect movement of the drawer between the open position and the closed position, the movement being caused by a user force; and a rotating module mounted within the drawer and including a base fixed to the drawer, a spring having a first end and a second end, the first end being attached to the base; and a rotating unit rotatably attached to the base, the second end of the spring being attached to the rotating unit to exert a force between the base and the rotating unit, the rotating unit being in contact with the intrusion-detection switch when the drawer is in the closed position.

* * * * *